(12) United States Patent
Vagelos (10) Patent No.: US 11,128,758 B2
(45) Date of Patent: Sep. 21, 2021

(54) DEVICE, SYSTEM, AND PROCESS FOR WIRELESS SERVICE OPTIMIZATION BASED ON ANALYZED WIRELESS DEVICE USAGE

(71) Applicant: TracFone Wireless, Inc., Miami, FL (US)

(72) Inventor: Ted Vagelos, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

(21) Appl. No.: 15/813,759

(22) Filed: Nov. 15, 2017

(65) Prior Publication Data

US 2018/0139334 A1 May 17, 2018

Related U.S. Application Data

(60) Provisional application No. 62/422,345, filed on Nov. 15, 2016.

(51) Int. Cl.
| | |
|---|---|
| *H04M 11/00* | (2006.01) |
| *H04M 15/00* | (2006.01) |
| *H04W 4/24* | (2018.01) |
| *H04W 24/02* | (2009.01) |
| *H04W 4/14* | (2009.01) |
| *H04W 24/08* | (2009.01) |
| *G06F 3/0482* | (2013.01) |

(52) U.S. Cl.
CPC .......... *H04M 15/80* (2013.01); *H04M 15/58* (2013.01); *H04M 15/8044* (2013.01); *H04M 15/8083* (2013.01); *H04W 4/14* (2013.01); *H04W 4/24* (2013.01); *H04W 24/02* (2013.01); *H04W 24/08* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 2005/0220280 | A1* | 10/2005 | Steinberg | H04M 15/00 379/93.12 |
| 2007/0281663 | A1* | 12/2007 | Sandholm | H04L 12/14 455/406 |
| 2010/0121744 | A1* | 5/2010 | Belz | H04M 15/00 705/30 |
| 2011/0275344 | A1* | 11/2011 | Momtahan | H04L 12/1492 455/405 |

(Continued)

*Primary Examiner* — Erika A Washington
(74) *Attorney, Agent, or Firm* — BakerHostetler (57) ABSTRACT

Disclosed is a method for determining a most cost effective wireless service for a wireless device implemented at least in part in the wireless device. The method includes obtaining with a wireless device processor wireless service usage information for the wireless device. The method further includes determining with a processor a cost of various wireless service plans based on the wireless service usage information, determining with the processor the most cost effective wireless service in response to the determining with the processor the cost of various wireless service plans, and displaying a most cost effective wireless service information in a graphical user interface on a display of the wireless device. A device for implementing the method is disclosed as well.

20 Claims, 8 Drawing Sheets

(56) References Cited

U.S. PATENT DOCUMENTS

2012/0142310 A1* 6/2012 Pugh .................. H04L 41/0893
  455/406
2015/0264189 A1* 9/2015 Morgan ................ H04M 15/80
  379/114.03

* cited by examiner

DEVICE, SYSTEM, AND PROCESS FOR WIRELESS SERVICE OPTIMIZATION BASED ON ANALYZED WIRELESS DEVICE USAGE

CROSS-REFERENCE TO RELATED APPLICATIONS

This application claims the benefit from U.S. Provisional Application No. 62/422,345 filed on Nov. 15, 2016, which is hereby incorporated by reference in its entirety for all purposes as if fully set forth herein.

BACKGROUND OF THE DISCLOSURE

1. Field of the Disclosure

The disclosure generally relates to a device, system, and process for wireless service optimization. Moreover, the disclosure generally relates to a device, system, and process for wireless service optimization based on analyzed wireless device usage.

2. Related Art

Currently when wireless service users are looking to optimize their wireless coverage, there typically is no clear way for the wireless service user to be able to ascertain what wireless service and/or wireless service provider will provide the most cost effective wireless service as it relates to the wireless user's usage. In other words, optimizing wireless service for the wireless user based on historical usage.

Accordingly, a need exists in the art for innovative processes, systems, devices, and applications to provide a convenient manner for a user to determine an optimal wireless plan based on historical wireless usage.

SUMMARY OF THE DISCLOSURE

The foregoing needs are met, to a great extent, by the disclosure, with a process, system, device and application to determine an optimal wireless plan.

One aspect of the disclosure is directed to a method for determining a most cost effective wireless service for a wireless device implemented at least in part in the wireless device that includes obtaining with a wireless device processor wireless service usage information for the wireless device that includes at least one of the following: monthly data usage on cellular, monthly data usage on Wi-Fi, monthly inbound cellular minutes, monthly outbound cellular minutes, monthly text messages sent, and monthly text messages received, determining with a processor a cost of various wireless service plans based on the wireless service usage information, determining with the processor the most cost effective wireless service in response to the determining with the processor the cost of various wireless service plans, and displaying a most cost effective wireless service information in a graphical user interface on a display of the wireless device.

Another aspect of the disclosure is directed to a device configured to determine a most cost effective wireless service for a wireless device implemented at least in part in the wireless device that includes a wireless device processor configured to determine wireless service usage information for the wireless device that includes at least one of the following: monthly data usage on cellular, monthly data usage on Wi-Fi, monthly inbound cellular minutes, monthly outbound cellular minutes, monthly text messages sent, and monthly text messages received, a processor configured to determine a cost of various wireless service plans based on the wireless service usage information, the processor configured to determine the most cost effective wireless service in response to the determining with the processor the cost of various wireless service plans, and a graphical user interface on a display of the wireless device configured to display a most cost effective wireless service information.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects or aspects in addition to those described and of being practiced and carried out in various ways. Also, it is to be understood that the phraseology and terminology employed herein, as well as the abstract, are for the purpose of description and should not be regarded as limiting.

Reference in this application to "one aspect," "an aspect," "one or more aspects," "an aspect" or the like means that a particular feature, structure, or characteristic described in connection with the aspect is included in at least one aspect of the disclosure. The appearances of, for example, the phrases "an aspect" in various places in the specification are not necessarily all referring to the same aspect, nor are separate or alternative aspects mutually exclusive of other aspects. Moreover, various features are described which may be exhibited by some aspects and not by the other. Similarly, various requirements are described which may be requirements for some aspects but not by other aspects.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

In order to facilitate a fuller understanding of the disclosure, reference is now made to the accompanying drawings, in which like elements are referenced with like numerals. These drawings should not be construed as limiting the disclosure and intended only to be illustrative.

DETAILED DESCRIPTION

In today's marketplace, it would be beneficial to equip a wireless device user with the tools necessary to efficiently and effectively determine the most cost effective wireless billing plan. Preferably, the wireless service optimization may be accomplished on a wireless device without requiring live customer service agents. In one aspect, it would be beneficial to make the wireless optimization process relatively simple and straightforward.

Generally speaking, a prospective wireless customer or current wireless customer could implement an application. The application could be downloaded from a digital source (Google Play™, Android Market™, Apple Store™, or the like digital distribution source). The application then could be implemented to determine what is the most cost effective wireless plan for the wireless customer. In this regard, the application could, with the end-user's permission, obtain the following information on the end-user's wireless device: monthly data usage on cellular; monthly data usage on Wi-Fi; monthly inbound cellular minutes (MT); monthly outbound cellular minutes (MO); monthly text messages sent; monthly text messages received; the customer's ZIP code; the wireless network being utilized (i.e. AT&T, Verizon, T-Mobile, Sprint, U.S. Cellular, etc.); and the like. Once the information is obtained, either locally within the application or after contacting a server, the application may recommend the most cost effective wireless plan to the consumer and provide the customer with all of the relevant plan details.

In one aspect, the disclosure allows the wireless customer to order the new wireless service directly from the application. In some aspects, the application may pull the customer's name, address, phone number, and the like from the wireless device to complete the order and only require the customer to enter their payment method and confirm the billing and shipping address. In a further aspect of the disclosure, the wireless customer could enter what they are currently paying for their wireless service and the application would calculate their savings.

The disclosure may help wireless users to easily and quickly identify the most cost effective wireless plan and wireless carrier for their specific needs. It may be particularly beneficial for Mobile Virtual Network Operators (MVNOs) that include a number of wireless carriers and a number of wireless service plans including numerous brands and offerings. However, aspects of the disclosure may be equally applicable to Mobile Network Operators (MNO). The disclosure may help wireless users identify the best plan through a measurable metric such as data usage, coverage, talk, text, etc.

It is to be understood that system units and method steps described in this application may be employed in various forms of hardware, software, firmware, special purpose processors or a combination thereof. In one aspect, an application may be directed to a process and system utilizing a software application comprising executable code that is operably stored on one or more tangible non-transitory program storage devices including but not limited to a magnetic floppy disk, RAM, ROM, CD ROM and/or Flash memory.

In aspects including a "wireless network," the network may encompass any type of wireless network from which a Mobile Virtual Network Operator (MVNO) contracts with a Mobile Network Operator (MNO) wireless carrier to provide wireless services through the use of an electronic device, such as a Long Term Evolution (LTE) network, a fifth generation (5G) network, a Global System for Mobile Communication (GSM) network, Code-Division Multiple Access (CDMA) network, a network utilizing a communication channel as defined herein or the like, that may utilize the teachings of the present application to allow a wireless device to connect to a wireless network. In other aspects, the network may include a post-paid wireless carrier or Mobile Network Operators (MNO) that maintains and controls their own wireless networks. Namely, a MNO heavily relies on backend systems to address any provisional, billing, security and data issues that might threaten the health of their networks. In this regard, the disclosure may be implemented to determine the most cost effective wireless service for a wireless device provisioned by a MNO and/or a MVNO.

In one aspect of the disclosure, there is described a method for improving user experience to determine an optimal (most cost effective) wireless plan utilizing a wireless device. That is, determining an optimal wireless plan may be initiated via a wireless service optimization application 106 that determines an optimal wireless service provider and/or wireless service plan.

Figure 1:
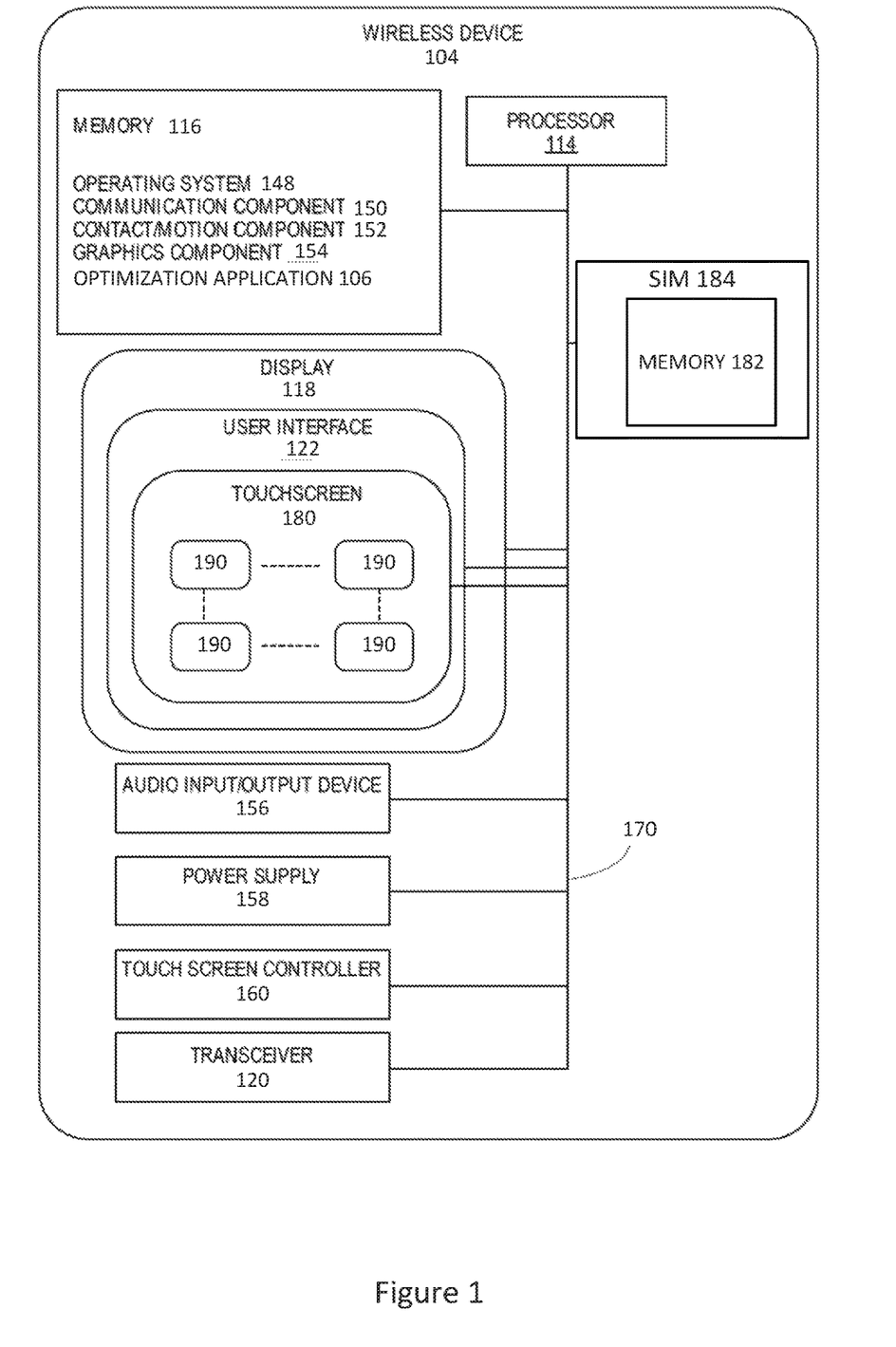
FIG. 1 illustrates a wireless device in accordance with an aspect of the disclosure.

FIG. 1 illustrates a device in accordance with an aspect of the disclosure. In this regard, the disclosure may be implemented in conjunction with a wireless device 104 executing the wireless service optimization application 106. The wireless device 104 includes a memory 116. The wireless device 104 may further include an operating system 148, a communication component 150, a contact/motion component 152, a graphics component 154, and the like. The operating system 148 together with the various components provides software functionality for each of the components of the wireless device 104. The memory 116 may include a high-speed, random-access memory. Also, the memory 116 may be a non-volatile memory, such as magnetic fixed disk storage, flash memory or the like. These various components may be connected through various communication lines including a data bus 170. The memory 116 may also store device related information including but not limited to a device serial number, such as, for example, an International Mobile Equipment Identify (IMEI), an Electronic Serial Number (ESN), Mobile Equipment Identifier (MEID), and/or the like.

In another aspect of the disclosure, the memory 116 of a wireless device 104 may include a database for storing user information. The user information may include further information as required by the service provider and may include information such as full name, address, date of birth, telephone number, service provider, email address, contact number, credit card information, and the like. In one aspect, the database may include security questions. In another aspect, the database may include user specified preferences.

The wireless device 104 may also include a SIM card 184 having a memory 182. The memory 182 stores the SIM card serial number, and may be implemented as, for example, an integrated Circuit Card ID (ICCID). Aspects of the disclosure may be equally applicable to wireless devices 104 that are implemented without a SIM card 184 having a memory 182.

The wireless device 104 also includes a processor 114 which may be a central processing unit configured to execute instructions, such as, for example, instructions related to software programs. Any processor can be used for the wireless device 104 as understood by those of ordinary skill in the art. The processor 114 may be coupled to the user interface 122, the SIM card 184 and the memory 116. The display 118 may be a liquid crystal display (LCD). Preferably the LCD includes a backlight to illuminate the various color liquid crystals to provide a more colorful display. The user interface 122 may be any type of physical input as readily employed in the field. For example, the user interface may have physical buttons. Alternatively, the user interface may be implemented on a touchscreen 180. Additionally, the wireless device 104 includes a power supply 158. The wireless service optimization application 106 may be executed by the processor 114.

The wireless device 104 may include an audio input/output device 156. The audio input/output device 156 may include speakers, speaker outputs, microphones, microphone inputs, and the like, for receiving and sending sound inputs. In an exemplary aspect, the audio input/output device 156 may include an analog to digital converter and a digital to analog converter for audio input and output functions respectively.

In a further aspect, the wireless device 104 may include a transceiver 120. The wireless device 104 may provide radio and signal processing as needed to access a network for services in conjunction with the transceiver 120. The processor 114 may be configured to process call functions, data transfer, and the like and provide other services to the user.

In an exemplary aspect, the touchscreen 180 of the disclosure may be implemented in the display 118 and may detect a presence and location of a touch of a user within the display area. For example, touching the display 118 of the wireless device 104 with a finger or hand. The touchscreen 180 may also sense other passive objects, such as a stylus. The wireless device 104 may further include a touch screen controller 160.

In operation, the display 118 may show various objects 190 associated with applications for execution by the processor 114. For example, a user may touch the display 118, particularly the touchscreen 180, to interact with the objects 190. That is, touching an object 190 may execute an application in the processor 114 associated with the object 190 that is stored in memory 116. Additionally or alternatively, touching an object 190 may open a menu of options to be selected by the user. The display 118 may include a plurality of objects 190 for the user to interact with. Moreover the display 118 may include a plurality of screens. The display 118 showing one screen at a time. The user may interact with the display 118 to move a screen into view on the display 118. Various objects 190 may be located in each of the screens.

The touchscreen 180 may have different implementations. The touchscreen 180 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The display 118 is generally configured to display a graphical user interface (GUI) 122 that provides an easy to use visual interface between a user of the wireless device 104 and the operating system or application(s) running on the wireless device 104. Generally, the GUI presents programs, files and operational options with graphical images. During operation, the user may select and activate various graphical images which appear on the display 118 in order to initiate functions, applications, and tasks associated therewith.

Figure 2:
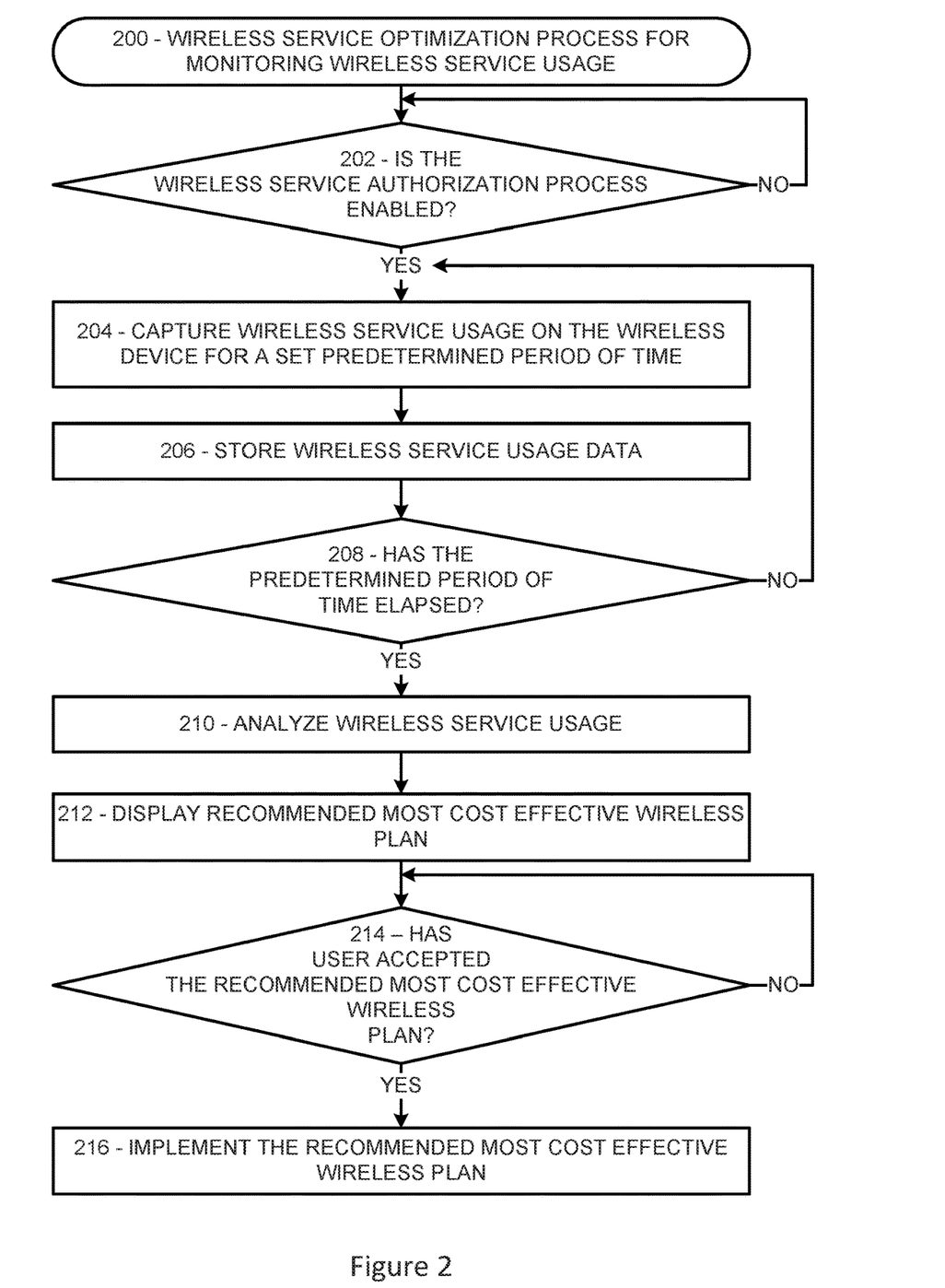
FIG. 2 illustrates a wireless device process in accordance with an aspect of the disclosure.
Figure 3:
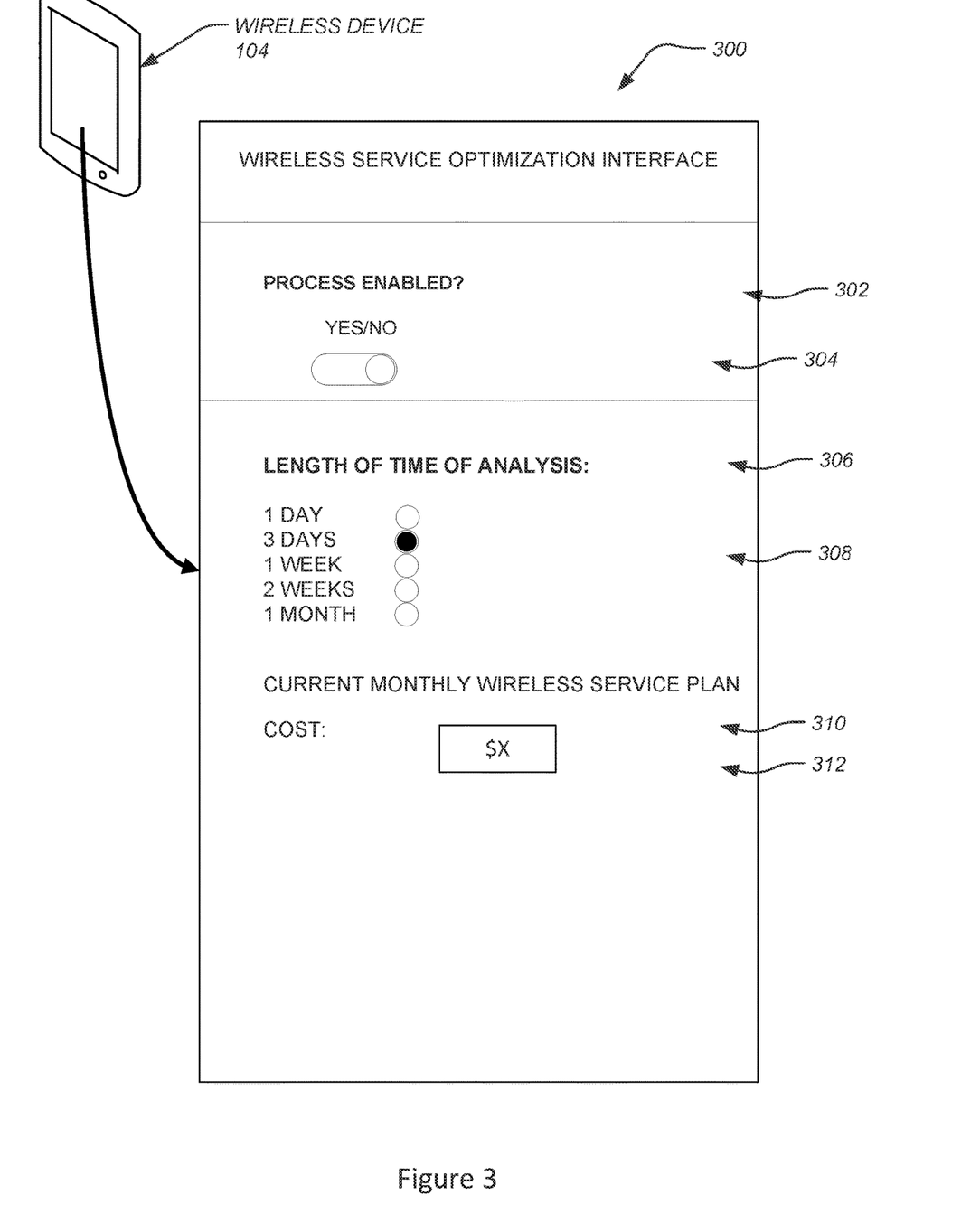
FIG. 3 illustrates a graphical user interface screen of a wireless device in accordance with an aspect of the disclosure.

FIG. 2 illustrates a device process in accordance with an aspect of the disclosure; and FIG. 3 illustrates a graphical user interface screen of a wireless device in accordance with an aspect of the disclosure. In particular, FIG. 2 illustrates a wireless service optimization process for monitoring wireless service usage 200. In one aspect, the process 200 is implemented by the wireless device 104.

As shown in box 202, the process 200 may determine whether the wireless service optimization process 200 is enabled. If the process 200 is enabled, the process 200 will advance to box 204. If the process 200 is not enabled, then the process will loop until enabled.

The enabling of the process 200 may be determined by input by the user to the graphical user interface 300 as shown in FIG. 3. In this regard, the graphical user interface 300 may query the user as to whether to enable or not enable the process 200 as shown by a request 302. The user may then interact with the graphical user interface 300 to enable or disable the process with an input feature 304. The input feature 304 is shown as a slide button, however other forms of input are contemplated as well. In one aspect, the box 202 process may not be implemented and the process 200 is always enabled.

In box 204, the process may capture wireless service usage on the wireless device 104 for a set predetermined period of time. In one aspect, the capturing of wireless service usage may be prior historical usage if such information is stored in the memory 116. In another aspect, the process 200 may capture wireless usage in an ongoing manner. For either aspect of the process 200, a length of time of the analysis may be input by the user in the graphical user interface 300. In this regard, the graphical user interface 300 may make a request 306 to input a length of time of analysis. Thereafter, a user can select a set amount of time for the wireless usage analysis. In this regard, the set amount of time for a wireless usage analysis may be received from the user by an input feature 308. As shown in the graphical user interface 300, the input feature 308 is a series of radio buttons. However, the input feature 308 may be implemented by other types of input features including drop-down menus, slide bars, input boxes, and the like.

In the aspect shown in the graphical user interface 300, the length of time of analysis query request 306 provides a radio buttons for: 1 day, 3 days, 1 week, 2 weeks, and 1 month, which shows the 3 days selected. Of course it should be noted that other amounts of time are contemplated as well.

In box 206, the process may store wireless service usage in memory 116 or other memory location. In one aspect, the capturing of wireless service usage may be prior historical usage if such information is available and thereafter may be stored in memory 116. In another aspect, the process 200 may capture wireless usage in an ongoing manner, which may be obtained from the transceiver 120 and/or the processor 114 as the user utilizes the wireless device 104 in an ongoing manner.

In a further aspect, the graphical user interface 300 may query the user as shown by reference 310 regarding their current monthly wireless service plan cost. This query is designed to receive this cost for comparison purposes. In a further aspect, the user may interact with the graphical user interface 300 to provide their current monthly wireless service plan cost with an input feature 312. The input feature 312 is shown as an input box, however other forms of input are contemplated as well.

In box 208, the process 200 may determine if the predetermined period of time elapsed. If the predetermined time period has elapsed, the process advances the box 210. If the predetermined time period has not elapsed, the process will continue to capture 204 and store 206 wireless service usage data. This aspect of process 200 may only be utilized when obtaining wireless usage in an ongoing manner. In this regard, if the user has selected 3 days as shown in the graphical user interface 300, the process 200 may store wireless service usage data for 3 days. Once the 3 days has elapsed, the process 200 will advance to box 210.

Figure 6:
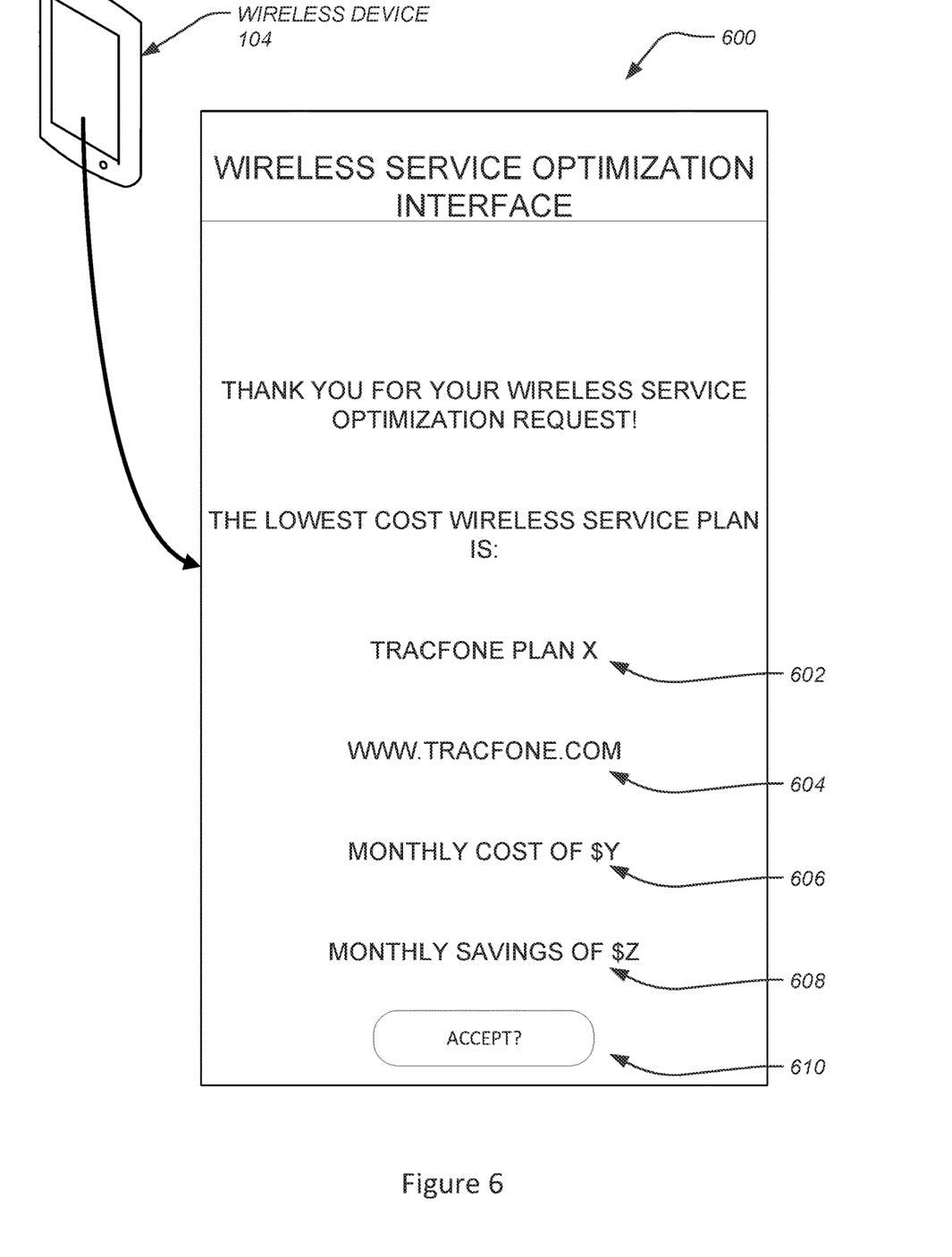
FIG. 6 illustrates an interface screen of a device in accordance with an aspect of the disclosure.

In box 210, the process may analyze wireless service usage consistent with process 500 described in greater detail below. Thereafter, as shown in box 212, the process 200 may display a recommended wireless plan. This is shown in greater detail in graphical user interface 600.

In box 214, the process may provide the user the ability to accept the recommended most cost effective wireless plan. If the user accepts the most cost effective wireless plan, the process may advance to box 216. On the other hand, if the user does not accept the recommended most cost effective wireless plan, the process may simply loop or the process 200 may end.

In box 216, the process may implement the recommended most cost effective wireless plan as requested by the user. In one aspect, the disclosure allows the user to order the new wireless service while implementing the process 200. In some aspects, the process 200 may pull the customer's name, address, phone number, and the like from the memory 116 of the wireless device 104 to complete the order. In some aspects, the process 200 may request the customer's name, address, phone number, and the like from the wireless user to complete the order. In one aspect, the process 200 may require the customer to enter their payment method and confirm the billing and shipping address. In another aspect, the process 200 may obtain their payment method and billing and shipping address from the memory 116. Thereafter, the process 200 may send the order related information to the selected new wireless service carrier to initiate the new wireless service. In this regard, the process 200 may further initiate wireless number porting, account set up, wireless service provisioning, and the like.

Figure 4:
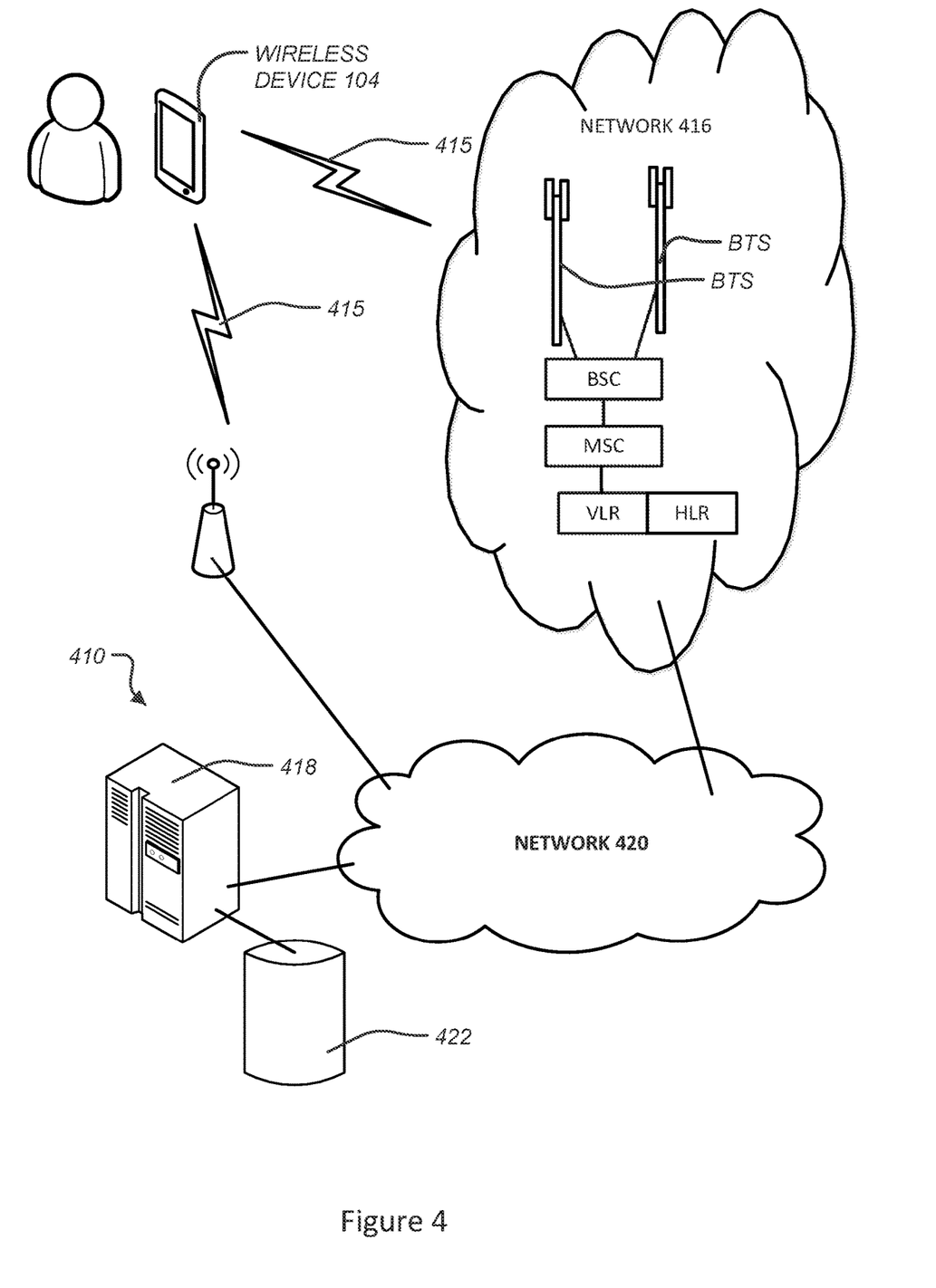
FIG. 4 illustrates a wireless service optimization system in accordance with an aspect of the disclosure.

FIG. 4 illustrates a wireless plan optimization system in accordance with an aspect of the disclosure. In one aspect, there is disclosed a wireless plan optimization system 410 as illustrated in FIG. 4. The wireless plan optimization system 410 illustrated in FIG. 4 may be implemented at least in part by a wireless carrier, by third-party system, or the like. In another aspect, the features of the wireless plan optimization system 410 may be implemented by the wireless service optimization application 106 in the wireless device 104.

More specifically, the wireless plan optimization system 410 may be used to provide an optimized wireless plan to the wireless device 104. The wireless plan optimization system 410 may provide information regarding optimal wireless services for the wireless device 104 without requiring access to an agent, website, or wireless/landline telephone system. The wireless plan optimization system 410 may include a database 422 that includes a plurality of wireless service plans, costs associated with these wireless service plans, and an application that is configured to receive the request and search the database 422 to find the optimal wireless service plan based on the process 200 and wireless usage by the user noted above. In one aspect, the wireless plan optimization system 410 may be implemented by a server 418. In another aspect, the features of the wireless plan optimization system 410 may be implemented by the wireless service optimization application 106 in the wireless device 104.

In one aspect, a user operating the wireless device 104 may execute the wireless service optimization application 106 to obtain information on optimal wireless services. The wireless device 104 then may generate an optimal wireless service request that at least includes the stored wireless usage information in memory 116 associated with box 206 of the process 200. The request may be transmitted over a communication channel 415 over a wireless carrier network 416 from the wireless device 104. The request may be delivered across the wireless carrier network 416 to the wireless plan optimization system 410 for use in obtaining information on the optimal wireless services on the wireless device 104. In one aspect, when the wireless plan optimization system 410 operates outside the wireless carrier network 416, the request may be transmitted over a network 420 such as the Internet.

The wireless plan optimization system 410 may receive the request via a the communication channel 415 and then forward in real time the request to the wireless plan optimization system 410 for obtaining information on the optimal wireless services.

Figure 5:
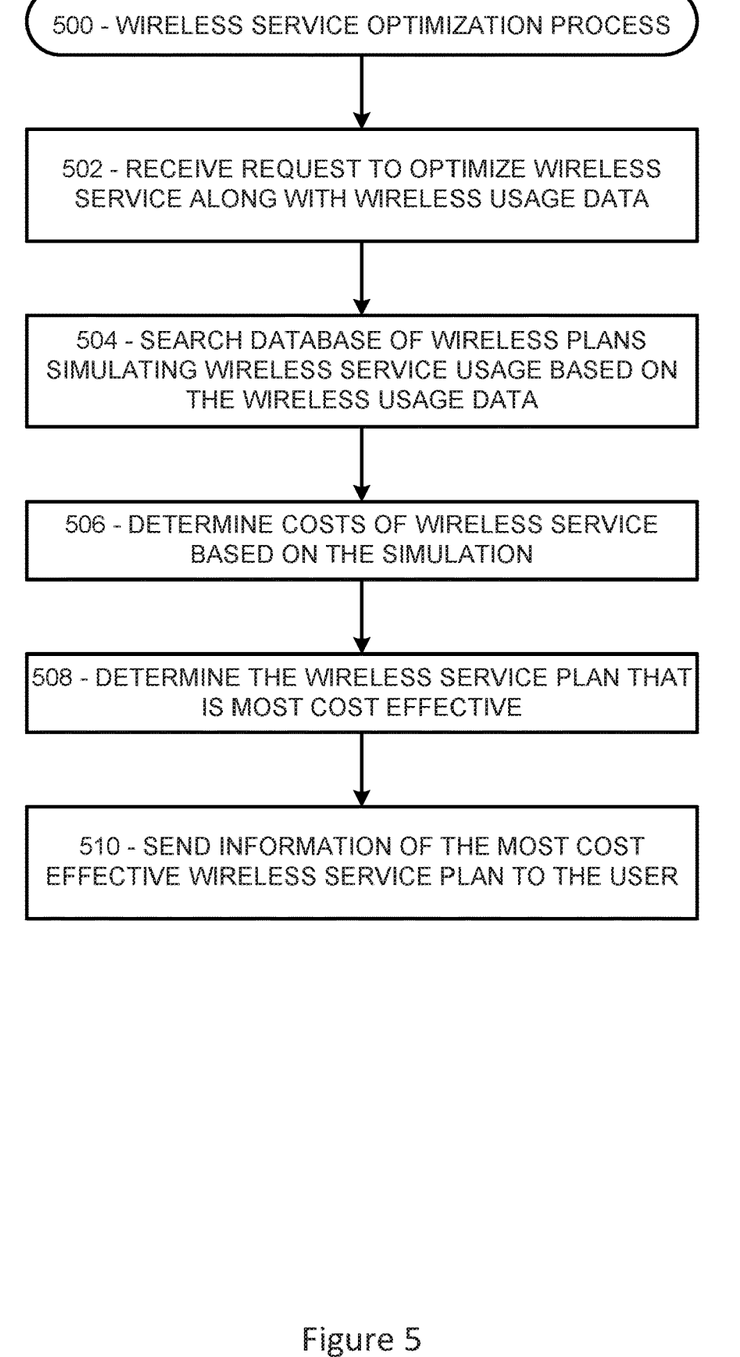
FIG. 5 illustrates a wireless service optimization system process in accordance with an aspect of the disclosure.

Once the request has been analyzed in the wireless plan optimization system 410, the wireless plan optimization system 410 may send information on the optimal wireless plan to the wireless device 104 consistent with the process 500 described in detail below.

FIG. 5 illustrates a wireless service optimization process in accordance with an aspect of the disclosure. In particular, FIG. 5 illustrates a wireless service optimization process 500 that may be implemented by the wireless plan optimization system 410, by the wireless device 104, or similar system.

In box 502, the wireless plan optimization system 410 may receive a request to optimize wireless service along with wireless usage information. The request may be sent from the wireless device 104 over the network 416 and/or the network 420.

Next, in box 504 the wireless plan optimization system 410 may search a database 422 of wireless plans. Thereafter, the wireless plan optimization system 410 may simulate wireless service usage based on the wireless usage information. In one aspect, the simulation may be implemented in the server 418. In one aspect, the simulation may be implemented in the wireless device 104.

In box 506, the wireless plan optimization system 410 may determine costs of wireless service based on the simulation for each of the wireless service plans stored in the database 422. In this regard, the determination of cost may include looking up details and information of various wireless service plans in the database 422.

In box 508, the wireless plan optimization system 410 may determine the most cost effective wireless service plan. In this regard, the wireless plan optimization system 410 may compare each of the costs associated with the simulation in box 504 and determine the most cost effective wireless service plan.

The wireless plan optimization system 410 may alternatively determine costs of wireless service based on an algorithm that includes as inputs the wireless service usage information and outputs the most cost effective wireless service plan.

Finally, in box 510 the wireless plan optimization system 410 may send information of the lowest cost wireless service plan to the user. The information on the most cost effective wireless service plan may include a link to a webpage to obtain the service, the associated costs of the wireless service, contact information regarding the lowest cost wireless service plan, the anticipated cost savings, and the like. This information may be rendered in a graphical user interface 600 of the wireless device 104 as shown by FIG. 6.

FIG. 6 illustrates an interface screen of a wireless device in accordance with an aspect of the disclosure. In particular, FIG. 6 illustrates a graphical user interface 600 presented on the wireless device 104. In one aspect, the graphical user interface 600 may display the lowest cost wireless service plan 602, a link to a webpage to obtain the service 604, the associated costs of the wireless service 606, the anticipated cost savings 608, and the like. As further shown in the graphical user interface 600, the user can accept the new wireless plan by providing a response to an input feature 610. In this regard, the input feature 610 may be an accept button. Other implementations are contemplated as well.

Figure 7:
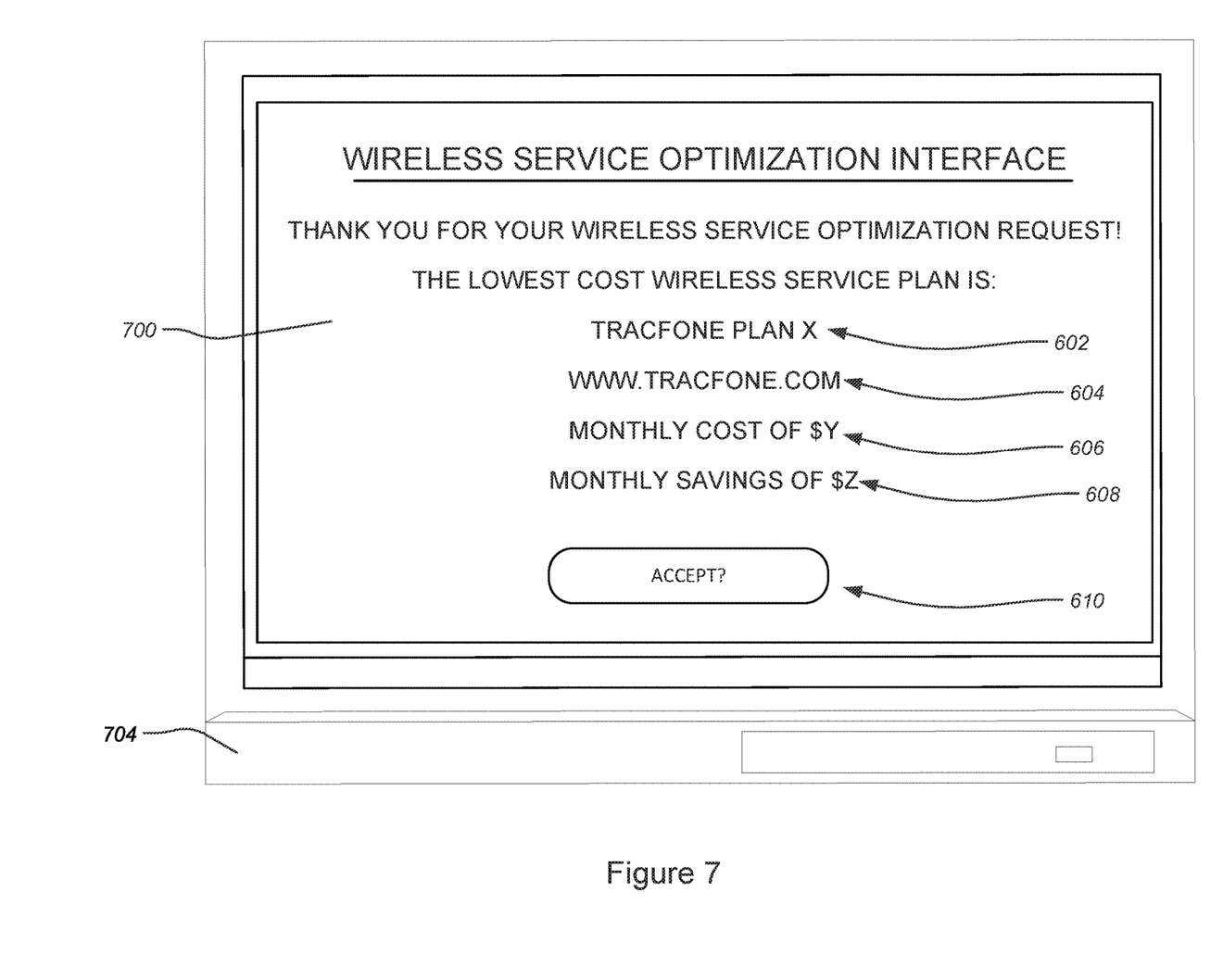
FIG. 7 illustrates an interface screen of an Internet enabled device in accordance with an aspect of the disclosure.
Figure 8:
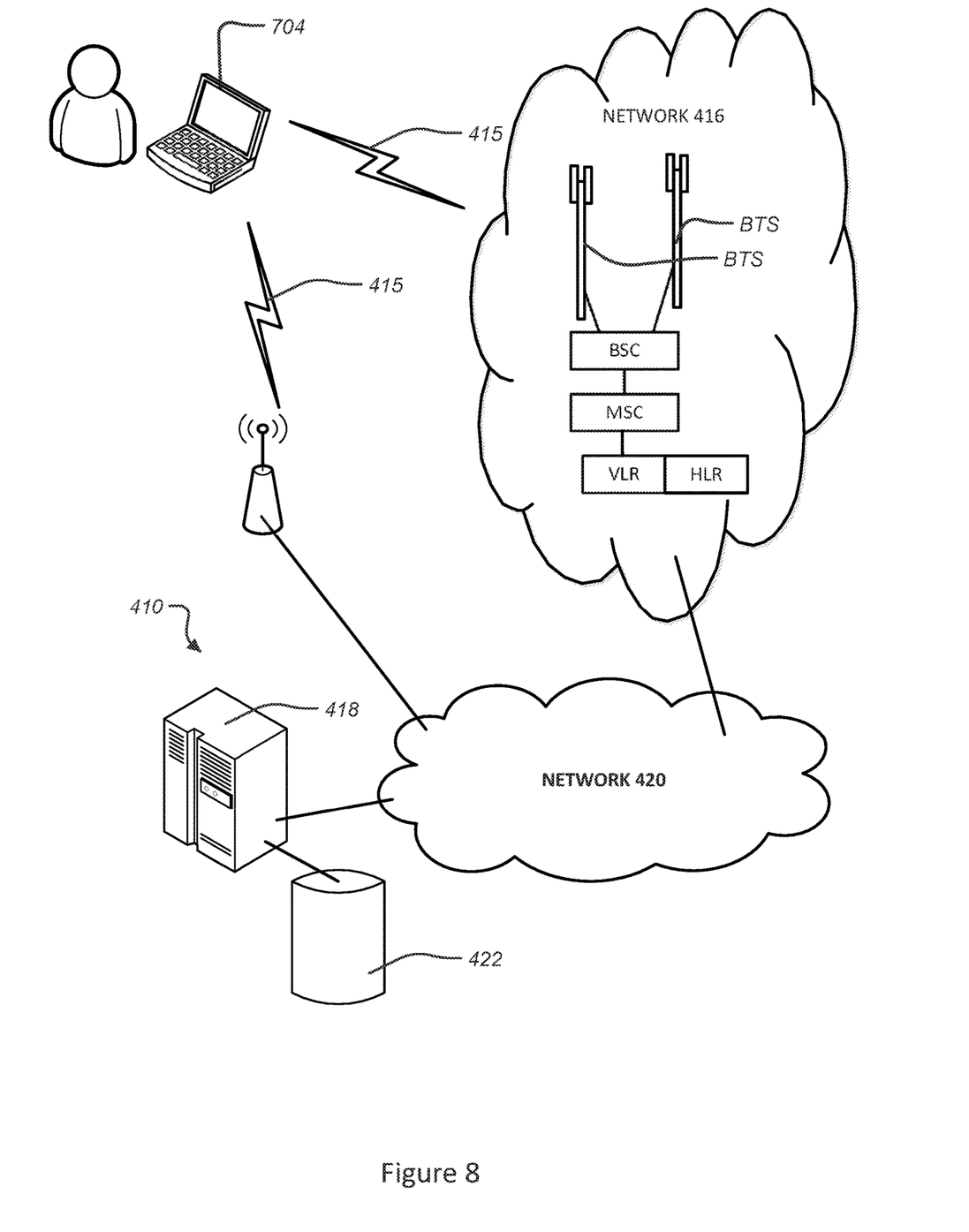
FIG. 8 illustrates a wireless service optimization system in accordance with an aspect of the disclosure.

FIG. 7 illustrates an interface screen of an Internet enabled device in accordance with an aspect of the disclosure; and FIG. 8 illustrates a wireless service optimization system in accordance with an aspect of the disclosure. In particular, another aspect of the disclosure may be implemented within an Internet enabled device 704 instead of the wireless device 104. In this regard, the Internet enabled device 704 may be a personal computer, a laptop, a tablet computer, or the like. In this regard, instead of capturing the wireless service usage data directly from the wireless device 104 as described above in conjunction with boxes 202, 204, 206, and 208 of FIG. 2, the wireless service usage information may be determined by the user from previous bills or other sources and input into a browser implemented by the Internet enabled device 704 for transmission to the wireless plan optimization system 410 as shown in FIG. 8 consistent with box 502 of FIG. 5.

Thereafter, as illustrated in FIG. 7 a graphical user interface 700 may be presented on the Internet enabled device 704. In one aspect, the graphical user interface 700 may display the lowest cost wireless service plan 602, a link to a webpage to obtain the service 604, the associated costs of the wireless service 606, the anticipated cost savings 608, and the like. As further shown in the graphical user interface 700, the user can accept the new wireless plan by providing a response to an input feature 610. In this regard, the input feature 610 may be an accept button. Other implementations are contemplated as well.

Accordingly, the disclosure has set forth a wireless service optimization process, system, and device that determines from wireless service usage, the most cost effective wireless carrier to activate their lines on and a billing plan to serve their needs. The coverage profile may include wireless phone calls data usage, text message usage, and the like.

The wireless carrier network 416 may include a Mobile services Switching Center (MSC) that may perform the switching of calls and that may include a Visitor Location Register (VLR). The wireless carrier network 416 may also include a Base Transceiver Station (BTS) and a Base Station Controller (BSC). The base transceiver station houses the radio transceivers that define a cell and handle the radio-link protocols with the wireless device 104. The base station controller manages the radio resources for one or more base transceiver stations. The base station controller is the connection between the wireless device 104 and the Mobile service Switching Center (MSC).

A Home Location Register (HLR) and the VLR together with the MSC, provide the call-routing and roaming capabilities. The HLR contains all the administrative information of each subscriber registered in the corresponding wireless carrier network 416, along with the current location of the wireless device 104. The above is an exemplary implementation of the wireless carrier network 416. Other types of networks utilizing other types of protocols may be implemented as well and are contemplated by the disclosure.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Aspects of the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The application described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

What is claimed is:

1. A method for determining a most cost effective wireless service plan for a wireless device implemented at least in part in the wireless device comprising:

receiving a set period of time with a wireless device processor that comprises a length of time of wireless service analysis;

tracking over the set period of time with a wireless device processor wireless service usage information that relates to wireless usage by a wireless device transceiver, the wireless service usage information for the wireless device comprising at least one of the following: monthly data usage on cellular, monthly data usage on Wi-Fi, monthly inbound cellular minutes, monthly outbound cellular minutes, monthly text messages sent, and monthly text messages received;

storing the wireless service usage information that relates to the wireless usage by the wireless device transceiver in a wireless device memory;

transmitting the wireless service usage information that relates to the wireless usage by the wireless device transceiver stored in the wireless device memory from the wireless device to a server after the set period of time;

determining with a processor a cost of various wireless service plans based on the wireless service usage information that relates to the wireless usage by the wireless device transceiver that was received from the wireless device;

determining with the processor the most cost effective wireless service plan in response to the determining with the processor the cost of various wireless service plans; and displaying a most cost effective wireless service plan information in a graphical user interface on a display of the wireless device, wherein the processor comprises a server and the method further comprises:

transmitting the wireless service usage information that relates to the wireless usage by the wireless device transceiver from the wireless device to the server in response to execution of a wireless service optimization application; and receiving in the wireless device the most cost effective wireless service plan information from the server, wherein the tracking with the wireless device processor the wireless service usage information that relates to the wireless usage by the wireless device transceiver further comprises obtaining with the wireless device processor the wireless service usage in an ongoing manner as used by the wireless device for the set period of time; and wherein the tracking with the wireless device processor the wireless service usage information that relates to the wireless usage by the wireless device transceiver further comprises retrieving with the wireless device processor the wireless service usage stored in the wireless device memory for the set period of time.

2. The method according to claim 1, further comprising:
receiving an acceptance of the most cost effective wireless service plan with the wireless device processor; and
implementing the most cost effective wireless service plan,
wherein the set period of time is received by the wireless device processor by input from a user in a graphical user interface of the wireless device.

3. The method according to claim 1, further comprising:
executing a wireless service optimization application in the wireless device processor,
wherein the most cost effective wireless service plan information displayed in the graphical user interface on the display of the wireless device is generated by the wireless service optimization application and further comprises displaying on the display of the wireless device generated by the wireless service optimization application at least one of the following: a most cost effective wireless service plan, a link to a webpage to obtain the most cost effective wireless service plan, associated costs of the most cost effective wireless service plan, and anticipated cost savings.

4. The method according to claim 1, further comprising:
storing in a non-transitory memory of the server a wireless service optimization application,
wherein the wireless service optimization application is implemented at least in part in the server; and
wherein the most cost effective wireless service plan information displayed in the graphical user interface on the display of the wireless device is generated by the wireless service optimization application and further comprises displaying on the display of the wireless device generated by the wireless service optimization application at least a most cost effective wireless service plan, a link to a webpage to obtain the most cost effective wireless service plan, associated costs of the most cost effective wireless service plan, and anticipated cost savings.

5. The method according to claim 1, further comprising:
simulating wireless service with the server based on the wireless service usage information;
determining the cost of various wireless service plans with the server in response to the simulation based on the wireless service usage information; and
determining the most cost effective wireless service plan with the server in response to the simulation based on the wireless service usage information,
wherein the most cost effective wireless service plan information displayed in the graphical user interface on the display of the wireless device is generated by a wireless service optimization application and further comprises displaying on the display of the wireless device generated by the wireless service optimization application at least a most cost effective wireless service plan, a link to a webpage to obtain the most cost effective wireless service plan, associated costs of the most cost effective wireless service plan, and anticipated cost savings.

6. The method according to claim 1, further comprising:
storing in a non-transitory memory of the wireless device a wireless service optimization application; and
capturing with the wireless service optimization application wireless service usage information that relates to the wireless usage by the wireless device transceiver for the wireless device that includes the monthly data usage on cellular, the monthly data usage on Wi-Fi, the monthly inbound cellular minutes, the monthly outbound cellular minutes, the monthly text messages sent, and the monthly text messages received,
wherein the wireless service optimization application is implemented at least in part in the wireless device.

7. The method according to claim 1, wherein the processor comprises the wireless device processor, the method further comprising:
simulating wireless service with the wireless device processor based on the wireless service usage information;
determining the cost of various wireless service plans with the wireless device processor in response to the simulation based on the wireless service usage information; and determining the most cost effective wireless service plan with the wireless device processor in response to the simulation based on the wireless service usage information,
wherein the tracking with the wireless device processor the wireless service usage information that relates to the wireless usage by the wireless device transceiver comprises tracking over a set period of time with the wireless device processor the wireless service usage by a wireless device transceiver and storing the wireless service usage information in the wireless device memory.

8. The method according to claim 1,
wherein the tracking with the processor the wireless service usage information that relates to the wireless usage by the wireless device transceiver further comprises retrieving with the processor the wireless service usage stored in the wireless device memory for the set period of time;
wherein the most cost effective wireless service plan information displayed in the graphical user interface on the display of the wireless device further comprises at least a most cost effective wireless service plan, a link to a webpage to obtain the most cost effective wireless service plan, associated costs of the most cost effective wireless service plan, and anticipated cost savings; and
wherein the processor comprises a server and the method further comprises:
transmitting the wireless service usage information from the wireless device to the server; and
receiving in the wireless device the most cost effective wireless service plan information from the server,
wherein the tracking with the wireless device processor the wireless service usage information that relates to the wireless usage by the wireless device transceiver comprises tracking over a set period of time with the wireless device processor the wireless service usage by a wireless device transceiver and storing the wireless service usage information in the wireless device memory.

9. The method according to claim 1, further comprising:
displaying on the display of the wireless device the graphical user interface having a prompt to input information,
wherein the information comprises at least a length of time for analyzing the wireless service usage information and a current monthly wireless service plan cost; and
wherein the tracking with the wireless device processor the wireless service usage information that relates to the wireless usage by the wireless device transceiver comprises tracking over a set period of time with the wireless device processor the wireless service usage by a wireless device transceiver and storing the wireless service usage information in the wireless device memory.

10. A device configured to determine a most cost effective wireless service plan for a wireless device implemented at least in part in the wireless device comprising:
a wireless device processor configured to receive a set period of time with a wireless device processor that comprises a length of time of wireless service analysis;
the wireless device processor configured to track over a set period of time a wireless service usage information that relates to wireless usage by a wireless device transceiver, the wireless service usage information for the wireless device comprises at least one of the following: monthly data usage on cellular, monthly data usage on Wi-Fi, monthly inbound cellular minutes, monthly outbound cellular minutes, monthly text messages sent, and monthly text messages received;
a wireless device memory configured to store the wireless service usage information that relates to the wireless usage by the wireless device transceiver in a wireless device memory;
a wireless device transceiver configured to transmit the wireless service usage information that relates to the wireless usage by the wireless device transceiver stored in the wireless device memory from the wireless device to a server after the set period of time;
a processor configured to determine a cost of various wireless service plans based on the wireless service usage information that relates to the wireless usage by the wireless device transceiver that was received from the wireless device;
the processor configured to determine the most cost effective wireless service plan in response to the determining with the processor the cost of various wireless service plans; and
a graphical user interface on a display of the wireless device configured to display a most cost effective wireless service plan information,
wherein the processor comprises a server and wherein:
the wireless device processor is further configured to track with the wireless device processor the wireless service usage information that relates to the wireless usage by the wireless device transceiver in an ongoing manner as used by the wireless device for the set period of time;
the wireless device is further configured to transmit the wireless service usage information from the wireless device that relates to the wireless usage by the wireless device transceiver to the server;
the wireless device is further configured to receive in the wireless device the most cost effective wireless service plan information from the server; and
the wireless device processor is further configured to track the wireless service usage information that relates to the wireless usage by the wireless device transceiver by retrieving with the wireless device processor the wireless service usage stored in the wireless device memory for the set period of time.

11. The device according to claim 10,
wherein the set period of time is received by the wireless device processor by input from a user in a graphical user interface of the wireless device.

12. The device according to claim 10, wherein:
the wireless device processor is further configured to execute a wireless service optimization application;
the display is further configured to display the most cost effective wireless service plan information displayed in the graphical user interface on the display of the wireless device generated by the wireless service optimization application and the most cost effective wireless service plan information further comprises at least one of the following: a most cost effective wireless service plan, a link to a webpage to obtain the most cost effective wireless service plan, associated costs of the most cost effective wireless service plan, and anticipated cost savings; and
the wireless device processor is further configured to receive an acceptance of the most cost effective wireless service plan to the most cost effective wireless service plan.

13. The device according to claim 10, further comprising a non-transitory memory associated with the server, the non-transitory memory configured to store a wireless service optimization application,
wherein the server is configured to at least in part in implement the wireless service optimization application; and
wherein the most cost effective wireless service plan information displayed in the graphical user interface on the display of the wireless device is generated by the wireless service optimization application and further comprises displaying on the display of the wireless device generated by the wireless service optimization application at least a most cost effective wireless service plan, a link to a webpage to obtain the most cost effective wireless service plan, associated costs of the most cost effective wireless service plan, and anticipated cost savings.

14. The device according to claim 10, wherein:
the server is further configured to simulate wireless service based on the wireless service usage information;
the server is further configured to determine the cost of various wireless service plans in response to the simulation based on the wireless service usage information;
the server is further configured to determine the most cost effective wireless service plan in response to the simulation based on the wireless service usage information; and
the most cost effective wireless service plan information displayed in the graphical user interface on the display of the wireless device is generated by a wireless service optimization application and further comprises displaying on the display of the wireless device generated by the wireless service optimization application at least a most cost effective wireless service plan, a link to a webpage to obtain the most cost effective wireless service plan, associated costs of the most cost effective wireless service plan, and anticipated cost savings.

15. The device according to claim 10, further comprising:
a non-transitory memory associated with the wireless device, the non-transitory memory configured to store a wireless service optimization application,
wherein the wireless device is configured to implement at least in part the wireless service optimization application to capture the wireless service usage information that relates to the wireless usage by the wireless device transceiver for the wireless device that includes at least the monthly data usage on cellular, the monthly data usage on Wi-Fi, the monthly inbound cellular minutes, the monthly outbound cellular minutes, the monthly text messages sent, and the monthly text messages received.

16. The device according to claim 10,
wherein the wireless device processor is further configured to obtain the wireless service usage information that comprises retrieving with the wireless device processor the wireless service usage stored in the wireless device memory for the set period of time;
wherein the set period of time is received by the wireless device processor by input from a user;
wherein the display is further configured to display the most cost effective wireless service plan information displayed in the graphical user interface on the display of the wireless device and the most cost effective wireless service plan information further comprises at least one of the following: a most cost effective wireless service plan, a link to a webpage to obtain the most cost effective wireless service plan, associated costs of the most cost effective wireless service plan, and anticipated cost savings; and wherein the processor comprises a server and the device further comprises:

the wireless device further configured to transmit the wireless service usage information from the wireless device to the server; and the wireless device further configured to receive in the wireless device the most cost effective wireless service plan information from the server, wherein the wireless device processor is configured to determine the wireless service usage information by tracking over a set period of time a wireless service usage by a wireless device transceiver and store the wireless service usage information in a wireless device memory.

17. The device according to claim 10, wherein the display of the wireless device is configured to generate the graphical user interface with a prompt to input information;

wherein the information comprises a length of time for analyzing the wireless service usage information and a current monthly wireless service plan cost; and wherein the wireless device processor is configured to determine the wireless service usage information by tracking over a set period of time a wireless service usage by a wireless device transceiver and store the wireless service usage information in a wireless device memory.

18. A method for determining a most cost effective wireless service plan for a wireless device implemented at least in part in the wireless device comprising:

receiving a set period of time with a wireless device processor that comprises a length of time of wireless service analysis;

tracking over the set period of time with a wireless device processor wireless service usage information that relates to wireless usage by a wireless device transceiver, the wireless service usage information for the wireless device comprising at least monthly data usage on cellular, monthly inbound cellular minutes, monthly outbound cellular minutes, monthly text messages sent, and monthly text messages received;

storing the wireless service usage information that relates to the wireless usage by the wireless device transceiver in a wireless device memory;

transmitting the wireless service usage information that relates to the wireless usage by the wireless device transceiver stored in the wireless device memory from the wireless device to a server after the set period of time;

determining with a processor a cost of various wireless service plans based on the wireless service usage information that relates to the wireless usage by the wireless device transceiver that was received from the wireless device;

determining with the processor the most cost effective wireless service plan in response to the determining with the processor the cost of various wireless service plans; and displaying a most cost effective wireless service plan information in a graphical user interface on a display of the wireless device, wherein the processor comprises a server and the method further comprises:

transmitting the wireless service usage information that relates to the wireless usage by the wireless device transceiver from the wireless device to the server in response to execution of a wireless service optimization application; and receiving in the wireless device the most cost effective wireless service plan information from the server, wherein the tracking with the wireless device processor the wireless service usage information that relates to the wireless usage by the wireless device transceiver further comprises retrieving with the wireless device processor the wireless service usage stored in the wireless device memory for the set period of time;

wherein the set period of time is received by the wireless device processor by input from a user in a graphical user interface of the wireless device;

wherein the tracking with the wireless device processor the wireless service usage information that relates to the wireless usage by the wireless device transceiver further comprises obtaining with the wireless device processor the wireless service usage in an ongoing manner as used by the wireless device for the set period of time; and wherein the most cost effective wireless service plan information displayed in the graphical user interface on the display of the wireless device is generated by a wireless service optimization application and further comprises displaying on the display of the wireless device generated by the wireless service optimization application at least a most cost effective wireless service plan, a link to a webpage to obtain the most cost effective wireless service plan, associated costs of the most cost effective wireless service plan, and anticipated cost savings.

19. The method according to claim 18, further comprising:

storing in a non-transitory memory of the server a wireless service optimization application;

receiving an acceptance of the most cost effective wireless service plan with the wireless device processor; and implementing the most cost effective wireless service plan, wherein the wireless service optimization application is implemented at least in part in the server; and wherein the most cost effective wireless service plan information displayed in the graphical user interface on the display of the wireless device is generated by the wireless service optimization application and further comprises displaying on the display of the wireless device generated by the wireless service optimization application at least a most cost effective wireless service plan, a link to a webpage to obtain the most cost effective wireless service plan, associated costs of the most cost effective wireless service plan, and anticipated cost savings.

20. The method according to claim 18, further comprising:

simulating wireless service with the server based on the wireless service usage information;

determining the cost of various wireless service plans with the server in response to the simulation based on the wireless service usage information; and determining the most cost effective wireless service plan with the server in response to the simulation based on the wireless service usage information, wherein the most cost effective wireless service plan information displayed in the graphical user interface on the display of the wireless device is generated by a wireless service optimization application and further comprises displaying on the display of the wireless device generated by the wireless service optimization application at least a most cost effective wireless service plan, a link to a webpage to obtain the most cost effective wireless service plan, associated costs of the most cost effective wireless service plan, and anticipated cost savings.

\* \* \* \* \*